US012258781B2

(12) United States Patent
Sauret

(10) Patent No.: US 12,258,781 B2
(45) Date of Patent: Mar. 25, 2025

(54) DEVICE AND METHOD FOR INTEGRATED HANDS-FREE DOOR HANDLE

(71) Applicant: Etienne Sauret, Brooklyn, NY (US)

(72) Inventor: Etienne Sauret, Brooklyn, NY (US)

( * ) Notice: Subject to any disclaimer, the term of this patent is extended or adjusted under 35 U.S.C. 154(b) by 177 days.

(21) Appl. No.: 18/083,799

(22) Filed: Dec. 19, 2022

(65) Prior Publication Data

US 2023/0193653 A1 Jun. 22, 2023

Related U.S. Application Data

(60) Provisional application No. 63/290,664, filed on Dec. 17, 2021.

(51) Int. Cl.
*E05B 1/00* (2006.01)
*E05C 1/16* (2006.01)

(52) U.S. Cl.
CPC .............. *E05B 1/0053* (2013.01); *E05C 1/16* (2013.01)

(58) Field of Classification Search
CPC ................................. E05B 1/0053; E05C 1/16
See application file for complete search history.

(56) References Cited

U.S. PATENT DOCUMENTS 5,603,184 A 2/1997 Campbell et al.
6,293,598 B1 * 9/2001 Rusiana .................... E05C 1/14 70/91
7,571,694 B2 8/2009 Boerner
7,699,365 B2 4/2010 Liang et al.
8,522,482 B2 9/2013 Buck
8,720,116 B1 * 5/2014 Ahmad ................. E05B 1/0053 16/431
9,394,732 B1 * 7/2016 Ahmad ................. E05B 1/0046
11,426,861 B2 * 8/2022 Fulkerson ................. B25B 9/02
11,619,066 B2 * 4/2023 Bennett ................. E05B 1/0061 292/336.3
12,065,857 B2 * 8/2024 Watson ...................... E05B 7/00
2007/0192995 A1 * 8/2007 Houis ................... E05B 1/0069 16/412
2013/0076046 A1 * 3/2013 Shah ..................... E05B 1/0053 292/336.3
2014/0000170 A1 * 1/2014 Buck ..................... E05B 1/0053 49/353
2015/0211253 A1 * 7/2015 Shah ....................... E05B 45/06 292/336.3
2022/0010583 A1 * 1/2022 Brenner .................... G09F 3/00
(Continued)

*Primary Examiner* — Mark A Williams
(74) *Attorney, Agent, or Firm* — Liang & Hennessey LLP; Brian Hennessey

(57) ABSTRACT

A device includes a door latch activator configured to disengage a door latch from a door frame and a door handle coupled to the door latch activator and configured to activate the door latch activator to disengage the door latch from the door frame. The device further includes a movable plunger having a first end coupled to the door latch activator and adapted to activate the door latch activator to disengage the door latch from the door frame, and an arm rest coupled to a second end of the plunger. The second end is opposite the first end, and the arm rest includes a base region adapted to receive a downward force to engage the plunger. When the base region engages the plunger, the plunger causes the door latch activator to disengage the door latch from the door frame. The plunger may be spring-activated.

13 Claims, 3 Drawing Sheets

(56) References Cited

U.S. PATENT DOCUMENTS

| | | | | |
|---|---|---|---|---|
| 2023/0193653 | A1* | 6/2023 | Sauret | E05B 1/0053 16/110.1 |
| 2023/0279698 | A1* | 9/2023 | Caines | E05B 1/0053 292/255 |

* cited by examiner

DEVICE AND METHOD FOR INTEGRATED HANDS-FREE DOOR HANDLE

CROSS-REFERENCE TO RELATED APPLICATIONS

The present application claims priority to Provisional Patent Application No. 63/290,664, filed Dec. 17, 2021, entitled "DEVICE AND SYSTEM FOR INTEGRATED HANDS-FREE DOOR HANDLE", which is incorporated by reference in its entirety.

BACKGROUND OF THE INVENTION

1. Field of the Invention

The present invention relates to door handles, and in particular provides a new technical solution for opening doors without using a hand.

2. Description of the Related Art

Most doors are operated by a person using their hand to open the door, either by turning a knob, pushing on a pad, or turning or pulling a handle. Automatic doors are known which either open when someone approaches or which constantly turn, in the case of revolving doors, allowing people to pass through. Due to the possibility of diseases being spread through hand contact, it is desirable that doors which are not automatic are nonetheless able to be opened without using a hand. Additionally, people often have their hands full and desire to open a door. Current hands free door handle devices are add-ons that are flimsy and hard to operate, or require the use of the foot and/or good coordination to operate.

SUMMARY OF THE INVENTION

There remains a need for a sturdy fully integrated system that allows the use of the arm to open a door, and a system compatible with existing handles that is easy to use and easy to clean. The compatibility with stock handles allows for a wide choice of looks and functionalities that the existing handle market provides, including handles with push button privacy lever typically used for bathroom doors, thus enabling the push down function while keeping the hardware already in use in a building.

The present invention relates to a door handle that can be operated without the use of a hand. The invention provides a mechanism that allow the use the wrist or the arm to activate the latch mechanism, allowing users that have reduced hand mobility, want to avoid touching contaminants with their hands, or have both hands occupied for example to carry a package, to open a door easily.

The present invention provides a door handle for a door that provides a traditional handle along with an arm rest activatable to unlatch and open a door, for both push-to-open and pull-to-open doors. In particular, the user is able to use their forearm to activate the door handle, and then to either push or pull the door open, depending on which way the door is configured to open, along with opening the door in a traditional way using a hand.

A spring activated shaft is coupled to latch mechanism. A forearm rest is positioned on the top end of the shaft, and oriented differently for doors that are pushed or pulled to be opened. Specifically, the forearm rest has a base portion for pushing down, and a vertical portion for pushing or pulling with the forearm to open the door. The vertical portion is arranged adjacent to the door for pushing the door open, and is arranged spaced apart from the door, so that the arm can fit between the door and the vertical portion, for pulling the door open.

The present system allows a user to unlatch a door by turning the handle without touching it. For doors that are equipped with a lock that unlocks when the handle is turned, the system is also be able to unlock the door and open it.

The present technology may be used for either a push-only or pull-only doors, without any difference in the parts being used. The present invention is provided in two sets, one for each side of the door, an additional push down mechanism to an existing handle. It uses the complete set of hardware provided by the products currently on the market and enhances it. Each set comprises identical components that translate the downward motion into the rotation of the handle, and one different configuration of the arm "handle" depending on whether it is on the side of a door that is push-to-open or pull-to-open. An ergonomic armrest provides comfort to user, no matter the arm size. The spring gives natural and smooth feel to the vertical motion, and keeps the system in the "ready position" when not in use.

An exemplary embodiment of a device according to the present technology includes a door latch activator configured to disengage a door latch from a door frame and a door handle coupled to the door latch activator and configured to activate the door latch activator to disengage the door latch from the door frame. The device further includes a movable plunger having a first end coupled to the door latch activator and adapted to activate the door latch activator to disengage the door latch from the door frame, and an arm rest coupled to a second end of the plunger. The second end is opposite the first end, and the arm rest includes a base region adapted to receive a downward force to engage the plunger.

When the base region engages the plunger, the plunger may cause the door latch activator to disengage the door latch from the door frame.

The plunger may be spring-activated to return to a neutral position when downward force on the base region of the arm rest is withdrawn. When the plunger is returned to the neutral position, the door latch activator may be configured to re-engage the door latch.

The plunger may be pneumatically-activated to return to a neutral position when downward force on the base region of the arm rest is withdrawn, and when the plunger is returned to the neutral position, the door latch activator may be configured to re-engage the door latch.

The arm rest may further include a vertical region adapted to receive at least one of a pulling force and a pushing force. When the door opens away from a user, the vertical region is adapted to receive the pushing force, and the pushing force causes the door to open.

The arm rest may include a lateral projection configured to shift the arm rest toward a door hinge point to facilitate engagement of the arm rest by an arm of a user. When the door opens toward a user, the vertical region is adapted to receive the pulling force, and the pulling force causes the door to open.

The device may include a housing adapted to enclose the door latch activator and at least a portion of the movable plunger. The housing may be configured to attach to a door and may include at least one primary guide engaging the plunger and adapted to restrict movement of the plunger to an axis defined by the plunger. The housing may include a secondary guide adapted to engage a projection on the plunger, and the secondary guide may prevent rotation of the vertical region beyond a comfort zone. The rotation may be about the axis.

The device may include an arm coupling the first end of the plunger to the door latch activator. The the door latch activator may include a disk rotatable around a center point, and the arm may be coupled to the disk away from the center point. When the movable plunger is moved the arm is moved and operates to rotate the disk to activate the door latch activator to disengage the door latch from the door frame.

The device may include a second door handle coupled to a second door latch activator and configured to activate the door latch activator to disengage the door latch from the door frame. The device may also include a second movable plunger having another first end coupled to the second door latch activator and adapted to activate the second door latch activator to disengage the door latch from the door frame. The device may further include a second arm rest coupled to another second end of the second plunger. The other second end may be opposite the other first end, and the second arm rest may include a second base region adapted to receive another downward force to engage the second plunger.

BRIEF DESCRIPTION OF THE DRAWINGS

The invention is described in more detail with reference to the enclosed drawings, in which only preferred embodiments are shown by way of example. In the drawings, like reference characters denote corresponding or similar elements throughout the various figures.

DETAILED DESCRIPTION OF EMBODIMENTS

A forearm rest (also referred to as an armrest) is positioned on the top end of the plunger, and oriented differently for doors that are pushed or pulled to be opened. Specifically, the forearm rest has a base portion for pushing down, and a vertical portion for pushing or pulling with the forearm to open the door. The vertical portion is arranged adjacent to the door for pushing the door open, and is arranged spaced apart from the door, so that the arm can fit between the door and the vertical portion, for pulling the door open. The ergonomic armrest provides comfort to user, no matter the arm size. A guide coupled to the mounting plate and/or the door may provide limits to the rotation of the armrest, so that it may be comfortably pulled or pushed, but not rotate to the point of not being oriented properly for use.

The present system allows a user to unlatch a door by turning the handle without touching it. For doors that are equipped with a lock that unlocks when the handle is turned, the system would also be able to unlock the door and open it.

The spring gives natural and smooth feel to the vertical motion, and keeps the system in a ready position when not in use.

Figure 1:
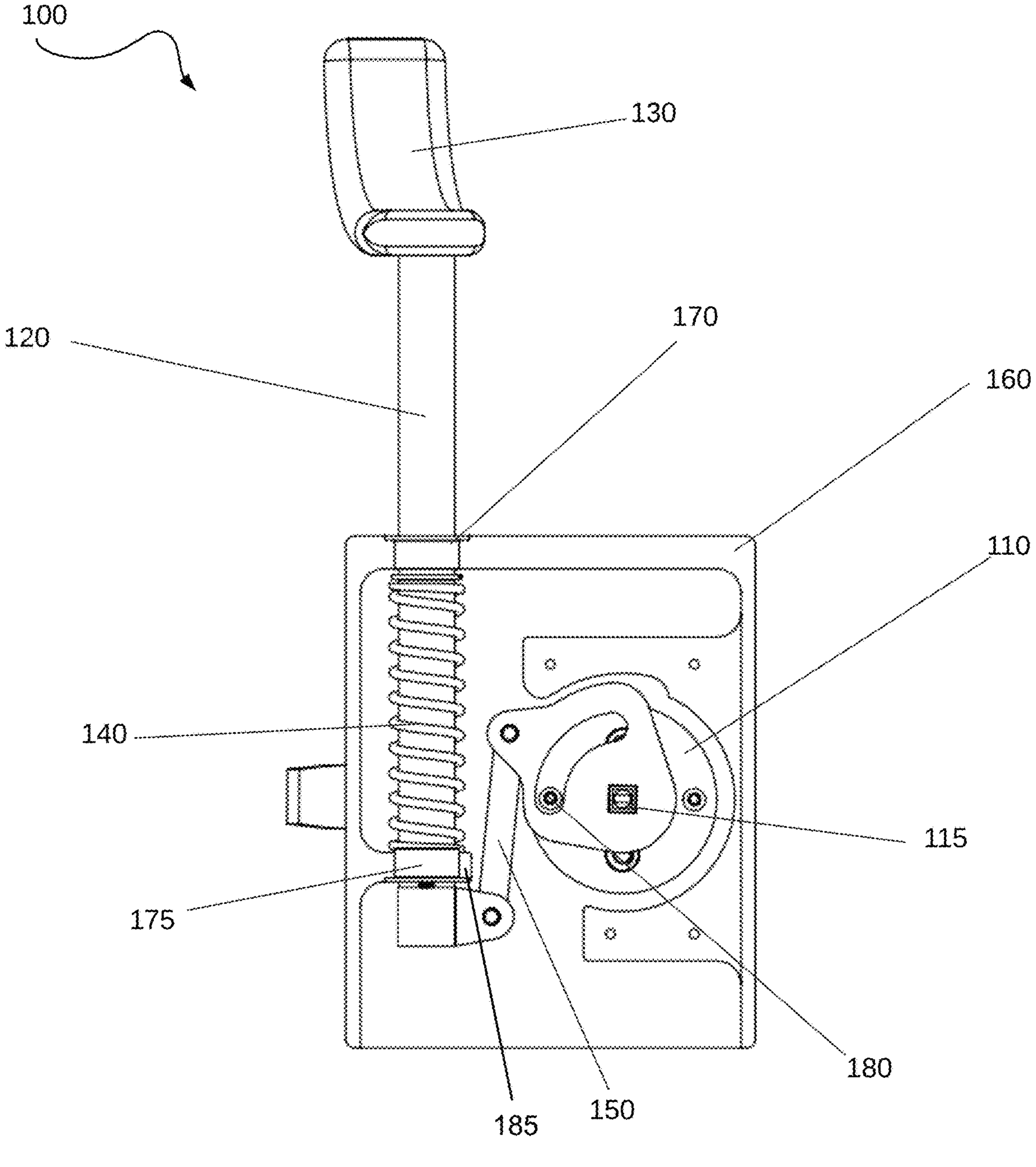
FIG. 1 is a back view of an exemplary embodiment of the system showing the internal mechanism of the system.

FIG. 1 is a back view of an exemplary embodiment of device 100 showing the internal mechanism of device 100. Device 100 is adapted to be mounted on a door and includes door latch activator 110 which is rotatable about center point 115 to activate a door latch to open a door. Device 100 includes movable plunger 120 which is adapted to move up and down. Alternative orientations are possible for plunger 120, including for instance laterally. Plunger 120 includes on one end arm rest 130, which includes a base region and a vertical region. Opposite arm rest 130, plunger 120 connects to arm 150, which in turn connects to off-center point 180 of door latch activator 110. Alternatively, plunger 120 may connect directly to off-center point 180 of door latch activator 110. Plunger 120 may pass through upper guide 170 and lower guide 175, which may operate to stabilize and guide plunger 120. Upper guide 170 and lower guide 175 may be incorporated in housing 160 or may be separate devices. In still further alternatives, one of upper guide 170 and lower guide 175 may be eliminated, and likewise, housing 160 is also optional. Plunger 120 may be coupled to spring 140 which may operate to return plunger 120 to a neutral position after a force pressing down on arm rest 130 is removed. Plunger 120 may pass through a center coil of spring 140, or may be coupled to spring 140 in any other appropriate way.

Figure 2:
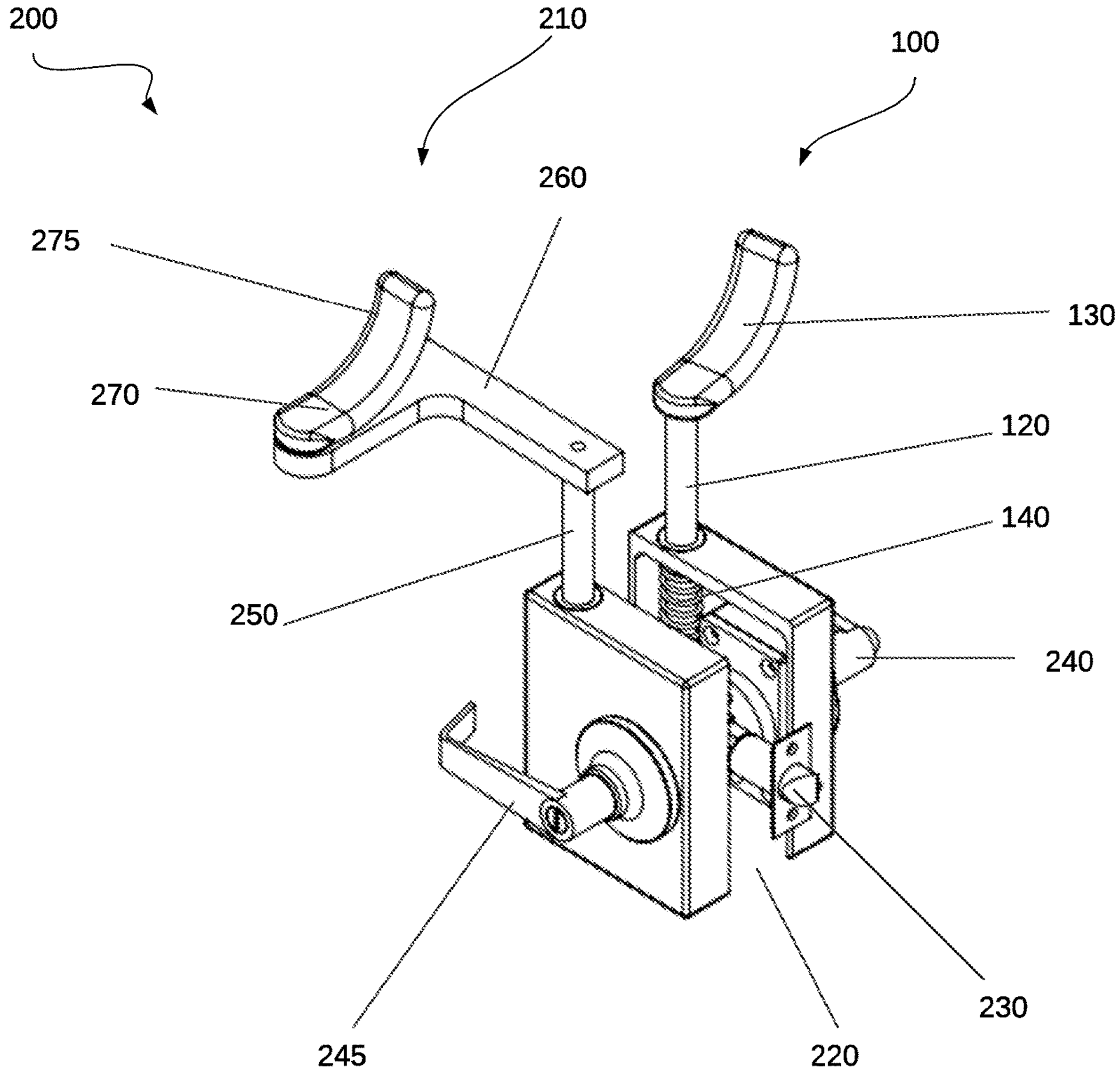
FIG. 2 is an isometric view of an exemplary embodiment of the system, showing both handles on both sides of the door.

FIG. 2 is an isometric view of an exemplary embodiment of system 200, showing device 100 on one side of door space 220 and device 210 on an opposite side of door space 220. Device 100 is shown in FIG. 2 with plunger 120, arm rest 130, and spring 140. Also shown in FIG. 2 is door handle 240 on device 110. In door space 220 is door latch 230, which operates to engage with a door frame to hold a door closed. Door latch 230 may be disengaged by door handle 240 or door handle 245 of device 210. Further, operating plunger 120 of device 100 or plunger 250 of device 210 operates to disengage door latch 230. Additionally, either device 100 or device 210 may be locked prevent disengagement of door latch 230, and the lock may be engageable by a key, a key card, a biometric sensor, and/or any other appropriate locking and unlocking mechanism. As shown in FIG. 2, a door situated in door space 220 would open towards device 100, and consequently, arm rest 130 of device 100 includes a vertical region configured to be pulled by an arm engaging arm rest 130. Arm rest 270 of device 210 includes several modifications which optionally distinguish it from arm rest 130. Arm rest 270 is configured to receive a pushing force to push a door open, and therefore has a vertical region 275 positioned adjacent to where a door would be positioned in door space 220. Arm rest 270 includes lateral projection 260 which operates to move arm rest 270 away from a door jam area and to move a base region of arm rest 270 away from a door to facilitate operation of device 210.

Figure 3:
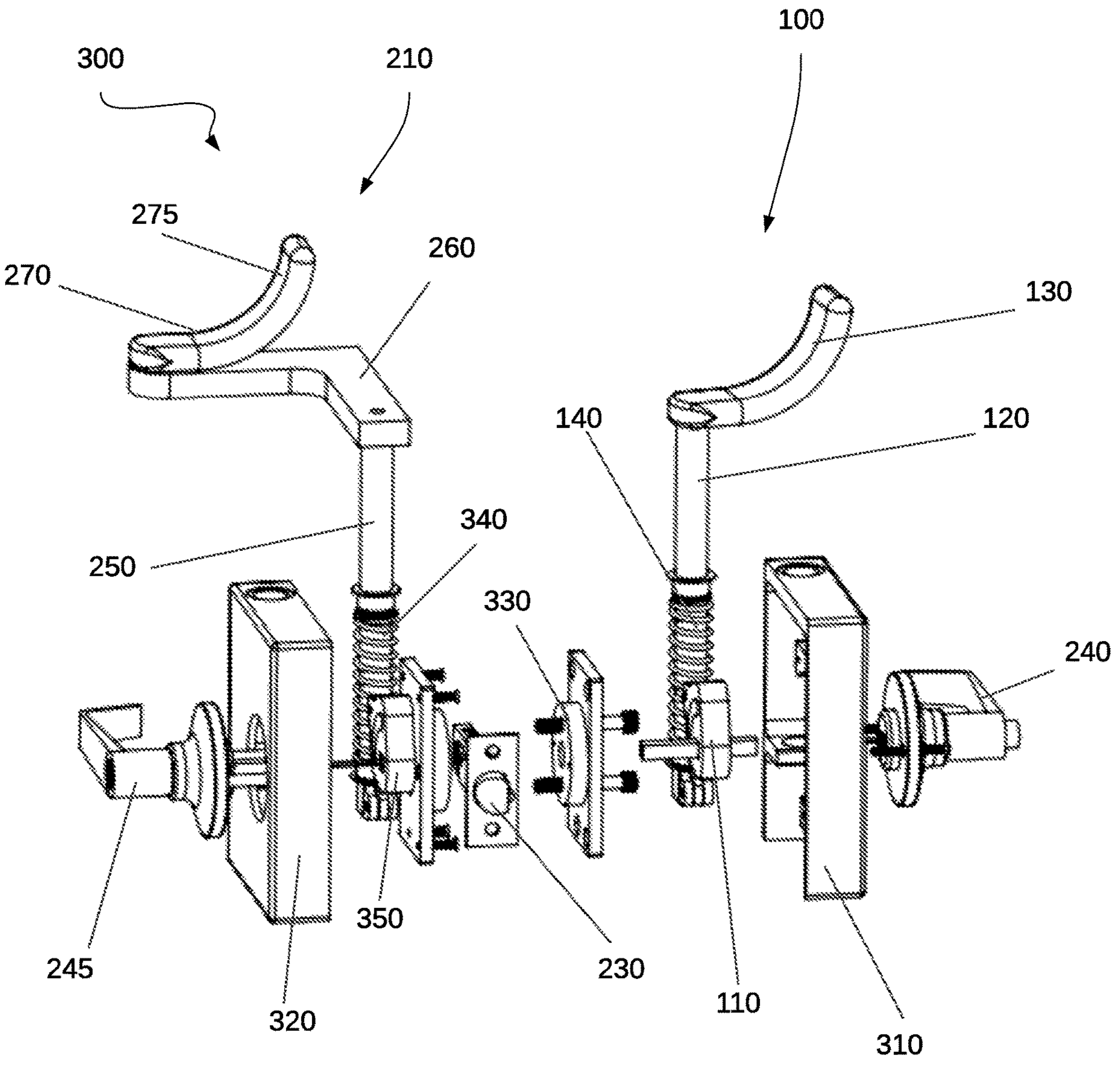
FIG. 3 an exploded view of an exemplary embodiment of the system.

FIG. 3 an exploded view of an exemplary embodiment of system 200. Device 100 is shown in FIG. 3 with plunger 120, arm rest 130, spring 140, door handle 240, and door latch activator 110. Device 100 in FIG. 3 also includes housing 310. FIG. 3 also includes door latch 230 operable by door latch mechanism 330. Device 210 is shown in FIG. 3 with plunger 250, arm rest 270 having vertical region 275, spring 340, door latch activator 350, door handle 245, and housing 320.

Door handles 240 and 245 also are referred to as stock handles, and may be mounted with screws, or any other appropriate mounting mechanism, on housing (also referred to as casings) 310 and 320, respectively. Plungers 120 and 150 (also referred to as push shafts) may extend into housings 310 and 320, respectively, to engage door latch activator 110 and 350 (also referred to as cams). The push shaft and the cam may be inserted into the casing and secured with a back plate. The front and the back casing may then be assembled to sandwich a door, with a spindle extension and a back stock handle finally mounted on the back casing.

The present technology provides a system that comprises mirror casings that both hold a complete mechanism to translate a push downward motion on push handles (also referred to as arm rests) into the rotation of the stock handles (also referred to as handles or door handles), which in turn operates the stock latch assembly (also referred to as a door latch or door latch activator) to release the door. A front push handle (also referred to as a vertical region) is oriented away from a user and adjacent to the door and is used to push the door to open, whereas a back pull handle (also referred to as a vertical region) is oriented towards the user and separated from the door to enable the user to put their forearm in between the vertical region and the door and pull the door towards them. In both cases, in use, the first movement is down so that the latch assembly releases the door, and the second is push or pull horizontally so that the door can move and give way to the user.

The stock handles can also be used for a standard operation of the door, and are positioned in a familiar position. Effectively, the latch assembly can be operated in four ways: from 1) a front stock handle, 2) a back stock handle, 3) a front push arm rest, or 4) a back arm rest.

The push shaft is inserted in the front casing with bushings in the middle and towards the bottom end. Bushings on the mount in the holes through which the plunger passes provide a smooth motion to the door opening device. The push handle is mounted at the top of the push shaft. The retainer ring transmits the push of the compression spring to the push shaft so that the push handle returns to its resting position. The push shaft extension is joined by a screw to the push shaft on one side, and by a pin to the connecting rod (also referred to as an arm) on the other. The connecting rod transmits the downward motion to the cam, which turns it into a rotation motion of the spindle. Together, the cam and spindle form the door latch activator. The cam has a cut out in its profile to make room for the screws that attach the stock handles to the casings. The screws are fixed while the cam rotates. Through this mechanism, a downward pressure on the push handle is translated to a rotation of the spindle. The downward travel of the push handle may be about 1.5 inch, stopped by the compressed compression spring. The rotation of the spindle may be about 80 degrees, which is enough to fully pull the latch to release the door.

The arm and cam assemblies may be assembled first. Each of these assemblies consist of the push arm, the push shaft, both bushings, the compression spring, a retainer ring, the push shaft extension, the connecting rod, cam, and the front and back plates. The front assembly also includes the push arm extension. When installed on the door, the stock handle is attached to the front casing with the stock screws provided with the stock handle. The stock handle is first left aside. The stock latch assembly is inserted in the door in a typical manner. Then the front casing assembly and the back casing assembly are placed on each side of the door with the front plate and back plate secured through the door hole. The spindle of the stock handle is inserted in the cam in this process. The round shapes on the front plate and back plate assist in positioning the front casing assembly and the back casing assembly on the door and also provide structural support if the screws get loose. The spindle extension is then inserted in the latch assembly. The mechanical connection between the stock spindle and the spindle extension is made through the latch assembly.

The installation of the handle on the door is completed by attaching the back stock handle to the casing with screws, making sure that the spindle extension is fitted into the square hole of the back stock handle. All handles (front stock handle, back stock handle, and both push handles) are now connected mechanically and actuate the latch assembly. The embodiments are easy to clean, and the only fastening hardware visible to the outside are the screws that attach the front stock handle to the front casing on one side, and the back stock handle to the back casing on the other.

The present technology may be used for either a push-only or pull-only doors, without any difference in the parts being used. Since the system doesn't attach directly to the handle, it works for a variety of handle shapes and/or sizes.

A plunger shaft (also referred to as a plunger) is slidingly coupled to a body (also referred to as a housing or a casing) such that it is movable substantially vertically with respect to the body. Bushings may be provided in the hole in the body through which plunger shaft passes in order to provide a smooth motion to hands-free door handle. A spring is arranged around the plunger shaft in an area above the body and below an arm rest such that the spring engages the body and arm rest to maintain a predetermined distance between the body and the arm rest when no force is applied to the arm rest. The spring allows but resists compression of the arm rest in the direction of the body. When the arm rest is pressed down, the spring compresses and the plunger shaft passes through the body causing the door latch activator to unlatch the door.

The arm rest is adapted to be engaged by the arm, specifically the forearm, of a user. The arm rest includes a vertical portion and a horizontal portion. A first force imparted by the arm of the user may be a downward force against the horizontal portion, which causes plunger shaft to slide downwards causing the door to become unlatched. Upon release of the downward force, the spring may operate to return the plunger shaft to its original rest position, causing the door latch to return to an engaged position.

The arm rest may be attached to the plunger shaft in at least two different orientations, depending on whether the door opens inward or outward with respect to a user. A vertical portion of the arm rest may be positioned away from the door, allowing a forearm placed on the arm rest to impart a pulling force to the arm rest to open the door. Another hands-free door handle may be arranged on an opposite side of the door, and the other arm rest may have a vertical portion oriented adjacent to the door. This enables a user to impart a pushing force via the vertical portion to push the door open.

The arm rest may be fixedly coupled to the plunger shaft, which together may rotate when coupled to the body. A further guide shaft (also referred to as a projection 185) may also be fixedly coupled to the arm rest and may extend through a second guide (for example, lower guide 175) of the body. The second guide may allow limited rotation of the arm rest to allow a more comfortable use of the hands-free door handle. In this manner, the arm rest may rotate when an arm is pressed, or pulled, against the vertical portion, to increase a contact surface between the vertical portion and the arm of a user. The second guide may allow an approximately 30 degree rotation in either direction from a normal, center position. Other possible amounts of allowed rotation are also possible.

An exemplary method for installing a hands-free door handle according to the present technology follows. The exemplary method includes a determination of the proper orientation of the armrest. If the door opens by pushing, the armrest should be oriented with the curved face pointing away from the door. However, if the door opens by pulling, the armrest should be oriented with the curved face pointing towards the door. Changing the orientation of the system from push to pull, or vice versa, involves re-positioning the guide shaft. The plunger shaft remains in the same position in both orientations. In one exemplary embodiment, there are two different threaded holes on the bottom of the armrest into which the guide shaft may be installed based on which orientation is preferred.

Mounting of the housing or casing may preferably be via drilled bolt holes that pass through the door, allowing hands-free door handles to be positioned on both sides of the door. Alternatively, screws may be used to attach hands-free door handles on one or both sides of a door. In still further alternatives, adhesive strips may be used to secure a mounting plate (also referred to as a back plate) to the door face. Combinations of these attachment methods are also possible. For instance, one hands-free door handle may be mounted with screws, and a hands-free door handle on the opposite side of the door may be mounted with adhesive strips.

LEGEND

100—device
110—door latch activator
115—center point
120—plunger
130—arm rest
140—spring
150—arm
160—housing
170—upper guide
175—lower guide
180—off-center point
185—projection
200—system
210—device
220—door space
230—door latch
240—door handle
245—door handle
250—plunger
260—lateral projection
270—arm rest
275—vertical region
310—housing
320—housing
330—door latch mechanism
340—spring
350—door latch activator

What is claimed is:

1. A device for opening a door, the device comprising:

a door latch activator configured to disengage a door latch from a door frame;

a door handle coupled to the door latch activator and configured to activate the door latch activator to disengage the door latch from the door frame;

a movable plunger having a first end coupled to the door latch activator, the movable plunder configured to move up and down with respect to the door, and the movable plunger configured to activate the door latch activator to disengage the door latch from the door frame when the movable plunger is moved down; and an arm rest coupled to a second end of the plunger, the second end being opposite the first end, the arm rest including a base region configured to receive a downward force from a user to engage the plunger, the base region forming an upward facing curve adapted to receive the downward force from a forearm of the user.

2. The device according to claim 1, wherein, when the base region engages the plunger, the plunger causes the door latch activator to disengage the door latch from the door frame.

3. The device according to claim 1, wherein the plunger is spring-activated to return to a neutral position when downward force on the base region of the arm rest is withdrawn.

4. The device according to claim 3, wherein, when the plunger is returned to the neutral position, the door latch activator is configured to re-engage the door latch.

5. The device according to claim 1, wherein:

the plunger is pneumatically-activated to return to a neutral position when downward force on the base region of the arm rest is withdrawn; and when the plunger is returned to the neutral position, the door latch activator is configured to re-engage the door latch.

6. The device according to claim 1, wherein the arm rest further includes a vertical region configured to receive at least one of a pulling force and a pushing force.

7. The device according to claim 6, wherein:

the door opens away from the user; and the vertical region is configured to receive the pushing force, the pushing force causing the door to open.

8. The device according to claim 7, wherein the arm rest comprises a lateral projection configured to shift the arm rest toward a door hinge point to facilitate engagement of the arm rest by an arm of a user.

9. The device according to claim 6, wherein:

the door opens toward the user; and the vertical region is configured to receive the pulling force, the pulling force causing the door to open.

10. The device according to claim 6, further comprising:

a housing configured to enclose the door latch activator and at least a portion of the movable plunger, the housing being configured to attach to a door;

wherein the housing includes at least one primary guide engaging the plunger and configured to restrict movement of the plunger to an axis defined by the plunger; and wherein the housing includes a secondary guide configured to engage a projection on the plunger, the secondary guide limiting a range of rotation of the vertical region beyond a zone configured to receive pressure from a user forearm, the rotation being about the axis.

11. The device according to claim 10, wherein the secondary guide allow an approximately 30 degree rotation in either direction from a normal, center position.

12. The device according to claim 1, further comprising:

an arm coupling the first end of the plunger to the door latch activator;

wherein the the door latch activator comprises a disk rotatable around a center point, the arm coupled to the disk away from the center point; and when the movable plunger is moved the arm is moved and operates to rotate the disk to activate the door latch activator to disengage the door latch from the door frame.

13. The device according to claim 1, further comprising:

a second door handle coupled to a second door latch activator and configured to activate the door latch activator to disengage the door latch from the door frame;

a second movable plunger having another first end coupled to the second door latch activator and configured to activate the second door latch activator to disengage the door latch from the door frame; and a second arm rest coupled to another second end of the second plunger, the other second end being opposite the other first end, the second arm rest including a second base region configured to receive another downward force to engage the second plunger.

* * * * *